Feb. 25, 1964  A. H. MORGAN  3,122,187
FRUIT DECAPPER
Filed May 23, 1962  2 Sheets-Sheet 2

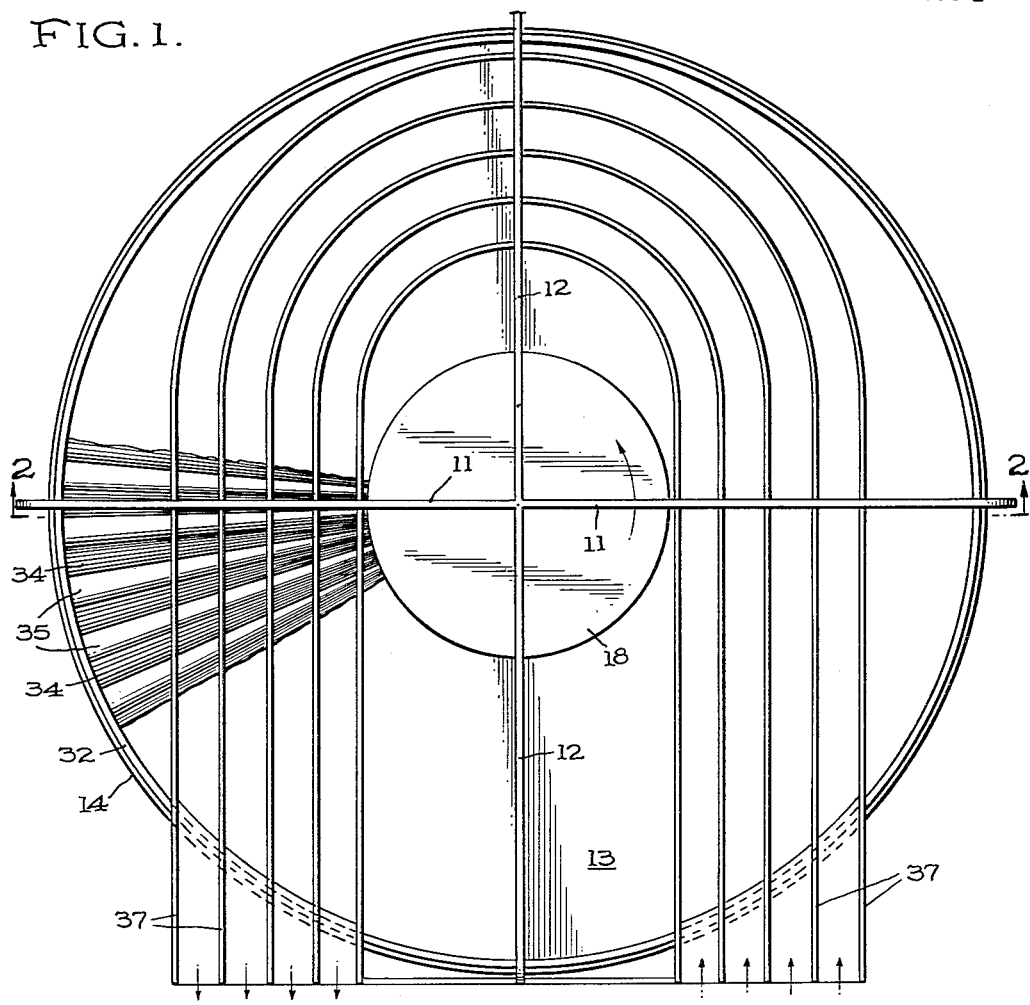

INVENTOR.
ARTHUR H. MORGAN
BY Cameron, Kerkam & Sutton
ATTORNEYS

United States Patent Office

3,122,187
Patented Feb. 25, 1964

3,122,187
FRUIT DECAPPER
Arthur H. Morgan, Knoxville, Tenn., assignor to The
University of Tennessee Research Corporation, Knoxville, Tenn., a corporation of Tennessee
Filed May 23, 1962, Ser. No. 197,107
12 Claims. (Cl. 146—55)

This invention relates to apparatus for decapping and destemming fruit and more particularly to such apparatus for decapping and destemming fruit such as strawberries which will destem and decap efficiently for all sizes of fruit and for fruit of varying degrees of ripeness.

U.S. Letters Patent No. 2,323,668 were granted to me on July 6, 1943, for a fruit decapper in which alternating smooth and splined rolls were mounted vertically with means provided for causing relative rotation between the rolls while rotating the assembly of rolls with means for feeding fruit to the rolls running transversely with respect thereto and forming a runway for the fruit to hold the fruit against the rolls. In this construction the rolls are of a constant diameter and are rotated at a constant speed with respect to the speed of rotation of the assembly of rolls. This device is efficient in destemming and decapping ripe fruit such as strawberries and has high efficiencies on the order of 93% with the Blakemore and Tennessee Beauty varieties of strawberries when the berries are ⅔ or more ripe. This machine has been the most successful of the decappers and destemmers available but its efficiency is sharply reduced when the berries are less than about ⅔ ripe and when the berries are of the newer varieties of berries which are now available on the market.

It is all but impossible to obtain fully ripe berries for machine capping and processing. Growers pick their fruit as soon as the code of the United States Department of Agriculture allows and berries are usually picked when they have obtained a certain degree of color. The grower therefore has an opportunity to pick, sell and ship rather hard, immature berries which reduces spoilage and permits sale to the distant high priced fresh market. Labor conditions and market requirements also determine when the berries are picked. Berries which are usually available to the processor arrive in varying degrees of ripeness, quality and sizes with the less attractive berries going to the processor and not to the fresh market. Green and misshapen berries frequently reach the processor and a decapping and destemming machine is required which can efficiently decap and destem berries in varying degrees of ripeness, quality and size.

The decapping and destemming machine of the present invention overcomes the lack of efficiency of the machine of my earlier patent for green, misshapen and new varieties of berries and efficiently destems and decaps all varieties of strawberries having varying degrees of ripeness, quality and size.

It is therefore the object of the present invention to provide a novel fruit decapper and destemmer which efficiently decaps and destems various varieties of fruit having varying degrees of ripeness, quality and size.

In the present concept pairs of tapered rolls are provided with one roll of each pair splined and the other smooth with the splined roll of each pair driven at the same speed and driving the associated smooth roll. The entire assembly of rolls is rotated in a horizontal plane about a vertical axis beneath guide rails for the berries. The tapered rolls extend radially from the vertical axis with their smallest diameter adjacent this axis. The rotation of the assembly of rolls in cooperation with the guide rails move the berries over the tapered rotating pairs of rolls to tumble the berries and to change the angle of the nip between the rolls so that somewhere during the course of the movement of the berries through the machine the stem and cap will be gripped and removed. Separate speed control means are provided for the speed of rotation of the pairs of rolls and for the speed of rotation of the assembly of rolls. I have found that relative adjustment of these speeds provides increased efficiency in decapping and destemming of the berries.

The cooperating pairs of tapered rolls provide an infinite number of pairs of vari-diametered rolling increments beginning at the inner small extremity of the tapered roll and extending outwardly to the large end of the roll. The nip or pinching action of the rolls therefore varies from one end of the rolls to the other. If the stem and cap is not gripped at one place along the nip of the rolls then as the berry is moved over the rolls it will come to a position where the nip of the rolls will grasp and remove the stem and cap. The depth of the splines on the rolls and their sharpness can be varied along the length of the rolls as by using discontinuous grooves to vary the nip of the rolls for efficient destemming and decapping. The surface speeds of the rotating tapered rolls vary from one end to the other of the rolls imparting varying turning and spinning action to the berries of varying diameters. In the horizontal plane of the pairs of rolls the pairs of rolls are more closely spaced toward the center of the assembly of rolls than at the outer circumference. All of these features increase the probability that any given berry in its movement through the machine will find the right angle of nip between a pair of rolls rotating at the proper surface feed to grip and effectively destem and decap the berry.

As noted above, control of the speed of rotation of the pairs of rolls with respect to the speed of rotation of the assembly of rolls increases the efficiency of the machine. Assuming a constant speed of rotation of the roll assembly, the speed of rotation of the pairs of rolls should be varied depending upon the condition of the berries. Lower speed of rotation of the pairs of rolls is required for fully ripe berries to provide efficient destemming and decapping with less abrading and mutilation of the berries while higher speeds of rotation of the pairs of rolls are required for firm or green berries.

The destemming and decapping machine of the present concept is capable of various mechanical embodiments two of which are shown in the accompanying drawings and are described hereinafter to illustrate the invention. These illustrative embodiments of the present invention are not to be construed as defining or limiting the scope of the present inventive concept.

In the accompanying drawings, in which like reference characters indicate like parts, FIG. 1 is a view from above of an illustrative embodiment of the present concept showing the pairs of tapered rolls arranged radially for rotation about their axes and for rotation in a horizontal plane of the entire assembly of rolls with cooperating guide rails for the berries disposed in parallel arrangement over the upper surfaces of the rolls;

FIG. 2 is a vertical view partly in section on the line 2—2 of FIG. 1;

Figure 3:
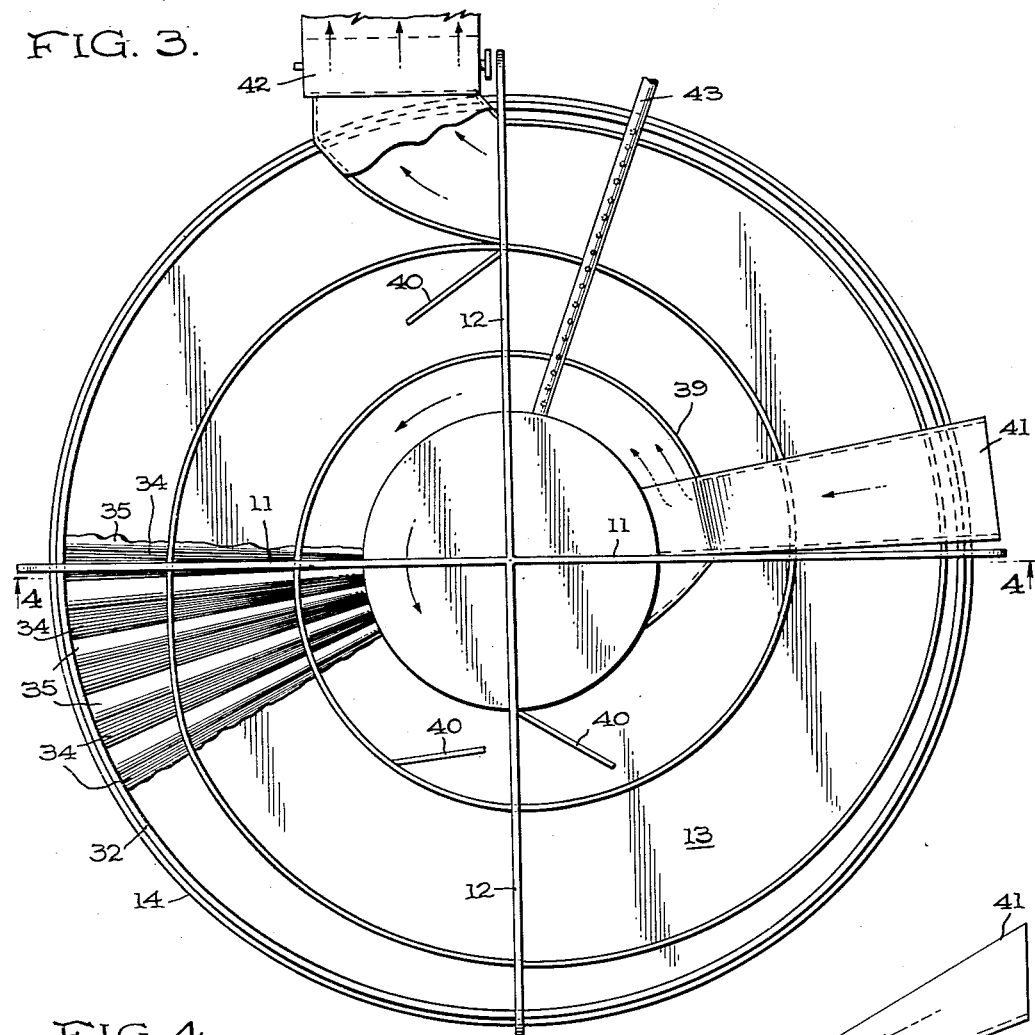
FIG. 3 is a view from above of another embodiment of the novel destemming and decapping apparatus of the present concept having a different arrangement of the guide rails for the berries.

In the embodiment of FIGS. 1 and 2 a cylindrical base housing 10 is provided supporting frames 11 and 12 which intersect at right angles at the center of the machine. Frames 11 and 12 support circular pan 13 which has an upstanding circumferential edge 14 to receive the drippings, caps and stems from the berries. Housing 10 is provided with top 15 which is centrally apertured and provided with a downwardly extending cylindrical flange 16. A suitable bearing 17 rests on top 15 and supports casing or hub 18. Casing 18 is provided with a hollow cylindrically downwardly extending flange 19 which rotates within flange 16. Flange 19 supports and is rotated by a suitable gear 20 which in turn is driven by meshing gear 21 rotated by a suitable variable speed speed reducer 22 mounted on base 10 and powered by shaft 23.

Shaft 24 is mounted for rotation in bearings 25 and 26 within cylindrical flange 19. Shaft 24 is rotated by gear 27 which is mounted thereon and which in turn is rotated by gear 28 driven by suitable variable speed speed reducer 29 mounted on base 10 and powered by shaft 30. A crown gear 31 is mounted on shaft 24 at the upper end thereof.

A circular rim 32 is connected by radial arms 33 to hub 18 for rotation therewith adjacent the outer edge of pan 13. A plurality of splined rolls 34 each having a cooperating smooth soft surface roll 35 are mounted radially in suitable bearings in hub 18 and rim 32. Each splined roll 34 carries and is rotated by gear 36 which engages crown gear 31. Smooth rolls 35 are not positively driven and are rotated by engagement with the splines of the associated splined roll 34.

A plurality of parallel berry guide rails 37 are secured to and beneath frames 11 and 12 and extend downwardly to adjacent the surfaces of rolls 34 and 35. Guide rails 37 are generally U-shaped so that berries entering the machine at the right in FIG. 1, as shown by the arrows, will be moved by the rotation of the assembly of rolls in a counterclockwise direction through the machine for discharge at the left of the machine, as shown by the arrows in FIG. 1.

Perforated pipes 38 may be disposed above and on frames 11 for spraying wash water over the berries as they pass through the machine.

Figure 4:
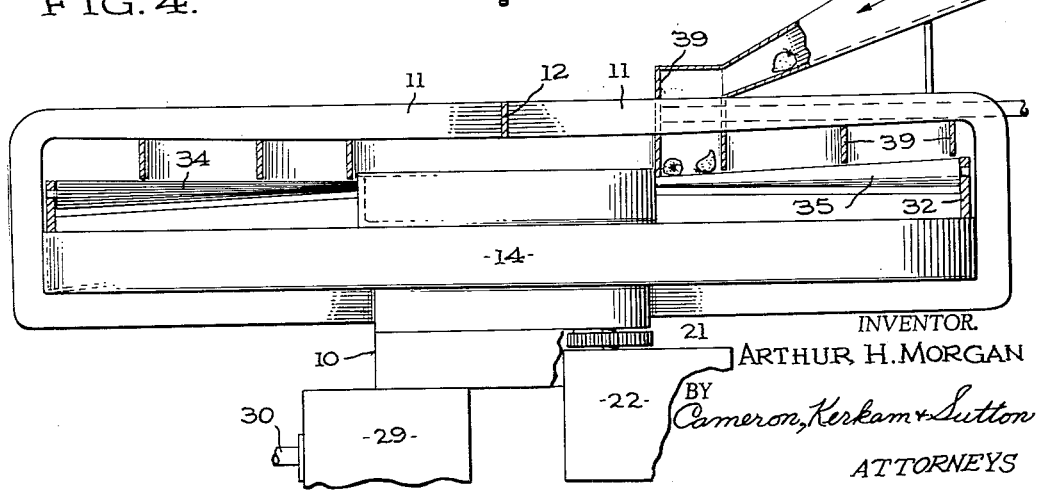
FIG. 4 is a vertical view, partly in section, of the embodiment of FIG. 3.

In the embodiment of FIGS. 3 and 4 the construction of the machine is identical to that of the embodiment of FIGS. 1 and 2 except for the arrangement of the guide rails for the berries. In the embodiment of FIGS. 3 and 4 a guide rail 39 is employed which is mounted beneath frames 11 and 12 and secured thereto in a spiral of ever increasing diameter from the center of the machine to its outer periphery. Guide rail 39 extends downwardly to adjacent the surface of rolls 34 and 35 and may be provided with angularly disposed deflector plates 40 to provide additional tumbling of the berries passing through the machine. In this embodiment the berries are conveyed to the center of the machine by chute 41 and are discharged onto the surface of the rolls adjacent their small ends. Rotation of the assembly of rolls in a counterclockwise direction, as seen in FIG. 3, then moves the berries in a counterclockwise direction over the surfaces of the rolls progressively outward toward the outer periphery thereof to discharge the berries at 42 in the direction of the arrows there shown. In this embodiment a single wash water pipe 43 is shown extending more or less radially from the center of the mechanism toward its outer periphery.

Variable speed reducer 22 controls the speed of rotation of the assembly of rolls in a horizontal plane while variable speed reducer 29 controls the speed of rotation of the pairs of rolls 34 and 35. The speeds of rotation of the assembly of rolls in the horizontal plane and of the pairs of rolls can be controlled independently to provide the best relative speeds of rotation for destemming and decapping the type of berries to be processed.

From the description above it is apparent that when the berries are introduced into the machine, either at the right in FIG. 1 or at the center in FIG. 3, the berries are gently forced to assume a multitude of positions at and along a multitude of varying pairs of splined rolls of varying diameters. At some point along the total path of movement of the berries through the machine the stem and cap will be nipped between the rolls for efficient decapping and destemming regardless of the size of the berry, its degree if ripeness or particular shape. Efficient decapping of smaller diameter berries will occur toward the inner ends of the rolls where they are of smaller diameter and larger diameter berries will be more efficiently decapped toward the outer ends of the rolls where they are of larger diameter.

It should now be apparent that the present invention in every way satisfies the several objectives discussed above.

Changes in or modifications to the illustrative embodiments described herein may now be suggested to those skilled in the art without departing from the present inventive concept. Reference should therefore be had to the appended claims to determine the scope of this invention:

What is claimed is:

1. In a berry decapping and destemming machine, a plurality of pairs of radially mounted horizontally disposed tapered rolls, first variable speed means for rotating said rolls, second variable speed means for rotating said pairs of rolls in their horizontal plane about a vertical axis, and guide rails disposed above said rolls forming an entry for berries to the machine and an exit for the berries from the machine.

2. A machine as described in claim 1 in which each of said pairs of rolls includes a splined roll and smooth soft surface roll en engagement therewith, said splined roll being rotated by said first variable speed means and rotating said soft surface roll.

3. A machine as described in claim 1 in which said tapered rolls have their smallest diameter adjacent the vertical axis of rotation and their largest diameter at their ends away from the vertical axis of rotation.

4. Apparatus as described in claim 1, said guide rails being generally U-shaped and spaced apart and parallel to each other.

5. Apparatus as described in claim 1, said guide rails forming a spiral of increasing diameter away from the vertical axis of rotation, the entry for the berries being adjacent the vertical axis of rotation.

6. In a berry decapping and destemming machine, a base, a hub mounted for rotation in a horizontal plane about a vertical axis on said base, first variable speed means for rotating said hub, a circular rim spaced from and rotated by said hub, a plurality of pairs of tapered rolls mounted in and extending between said hub and said rim in a horizontal plane, second variable speed means for rotating said tapered rolls and guide rails disposed above said rolls forming an entry for berries to the machine and an exit for the berries from the machine.

7. A machine as described in claim 6, each of said pairs of rolls including a splined roll and a smooth, soft surface roll in engagement therewith, said splined roll being rotated by said second variable speed means and rotating said soft surface roll.

8. A machine as described in claim 6, said tapered rolls having their smallest diameter adjacent said hub and their largest diameter adjacent said rim.

9. A machine as descrbed in claim 6, said guide rails being generally U-shaped and spaced apart and parallel to each other, the berries being placed on said rolls between said guide rails in a direction parallel to the direction of rotation of said hub.

10. A machine as described in claim 6, said guide rails forming a spiral of increasing diameter away from said hub toward said rim, the entry for the berries being adjacent said hub and the exit for the berries being adjacent said hub and the exit for the berries being adjacent said rim.

11. A machine as described in claim 6, said first named variable speed means for rotating said hub including a hollow cylindrical flange depending from said hub in said base, a gear mounted on said flange, a variable speed reducer mounted on said base and a gear rotated by said variable speed reducer meshed with said first gear.

12. A machine as described in claim 11, said second named variable speed means for rotating said rolls including a shaft mounted for rotation in said flange and extending into said hub, a crown gear on said shaft in said hub, a gear mounted on each of said splined rolls and meshing with said crown gear, a variable speed reducer mounted on said base, a gear rotated by said variable speed reducer and a gear mounted on said shaft and meshing with said last named gear.

References Cited in the file of this patent

UNITED STATES PATENTS

| | | |
|---|---|---|
| 2,318,805 | Silva | May 11, 1943 |
| 2,323,668 | Morgan | July 6, 1943 |